US006978570B1

(12) United States Patent
Clark et al.

(10) Patent No.: US 6,978,570 B1
(45) Date of Patent: Dec. 27, 2005

(54) ADJUSTABLE SWIVEL BASE

(75) Inventors: Richard N. Clark, Farmington Hills, MI (US); Jeffrey L. Clark, Commerce, MI (US)

(73) Assignee: Tecla Company, Inc., Walled Lake, MI (US)

(*) Notice: Subject to any disclaimer, the term of this patent is extended or adjusted under 35 U.S.C. 154(b) by 0 days.

(21) Appl. No.: 10/771,280

(22) Filed: Feb. 3, 2004

Related U.S. Application Data

(60) Provisional application No. 60/445,978, filed on Feb. 7, 2003.

(51) Int. Cl.[7] .............................................. A01K 91/08
(52) U.S. Cl. ........................ 43/27.4; 43/21.2; 114/255; 248/289.11
(58) Field of Search .............................. 433/27.4, 21.2, 433/43.12; 248/289.11; 114/255, 364

(56) References Cited

U.S. PATENT DOCUMENTS

| | | | |
|---|---|---|---|
| 385,522 A * | 7/1888 | Pierce .................... 248/289.11 |
| 399,444 A * | 3/1889 | Stevens ................. 248/289.11 |
| 1,129,342 A * | 2/1915 | Feist ...................... 248/289.11 |
| 1,985,985 A | 1/1935 | Gerline |
| 2,037,709 A | 4/1936 | Doyle |
| 2,851,234 A | 9/1958 | Scheifele |
| 3,008,259 A * | 11/1961 | Zornes ....................... 43/43.12 |
| 3,063,668 A * | 11/1962 | Yohe ........................... 43/21.2 |
| 3,162,408 A | 12/1964 | Markman |
| 3,193,964 A | 7/1965 | Hurst |
| 3,246,865 A * | 4/1966 | Latimer ....................... 43/21.2 |
| 3,384,334 A * | 5/1968 | Malachowski ......... 248/289.11 |
| 3,516,190 A * | 6/1970 | Cook ........................... 43/21.2 |
| 3,614,016 A * | 10/1971 | Reith ........................... 43/27.4 |
| 3,628,274 A * | 12/1971 | Wojahn .................... 43/43.12 |
| 3,719,331 A * | 3/1973 | Harsch ...................... 43/43.12 |
| 3,785,079 A * | 1/1974 | Rohn ........................ 43/43.12 |
| 3,844,058 A * | 10/1974 | King ............................ 43/27.4 |
| 3,916,555 A * | 11/1975 | Booth et al. ................. 43/27.4 |
| 3,929,365 A | 12/1975 | Hunt et al. |
| 3,937,415 A * | 2/1976 | Prinz ........................... 43/27.4 |
| 3,961,438 A * | 6/1976 | Henze et al. ................ 43/27.4 |
| 3,967,405 A * | 7/1976 | Henze et al. ................ 43/27.4 |
| 3,968,587 A * | 7/1976 | Kammeraad ................ 43/27.4 |
| 3,977,118 A * | 8/1976 | Seymour ..................... 43/21.2 |
| 4,000,653 A * | 1/1977 | Booth et al. ................ 374/136 |
| 4,004,366 A * | 1/1977 | Berry .......................... 43/27.4 |
| 4,044,489 A * | 8/1977 | Henze et al. ................ 43/27.4 |
| 4,044,968 A * | 8/1977 | Scott ........................... 43/27.4 |
| 4,049,225 A | 9/1977 | Chasen et al. |
| 4,050,180 A * | 9/1977 | King ............................ 43/27.4 |
| 4,064,811 A | 12/1977 | Copeland |

(Continued)

*Primary Examiner*—Darren W. Ark
(74) *Attorney, Agent, or Firm*—Reising, Ethington, Barnes, Kisselle, P.C.; William J. Waugaman

(57) ABSTRACT

An adjustable swivel base assembly and track for swivel mounting fishing boat downrigger or planar board masts, including a planar mounting base plate, a pair of stationary riser supports on the base plate, and a planar bottom bearing plate stationarily supported on the upper ends of the supports. Vertically spaced planar bottom and top bearings are stationarily affixed to the bearing plate and a planar swivel top plate is supported on and sandwiched slidably between the bearings, and is adapted to carry and swivel the mast load. An indexable locking system selectively locks the swivel plate in any one of a plurality of angularly spaced positions. A track is mounted on a fishing boat and has side edge flanges with mutually facing in-turned lips that overlap opposite side edges of the base plate when slidably and releasably mounted in the track.

38 Claims, 5 Drawing Sheets

FIG. 3

U.S. PATENT DOCUMENTS

| | | |
|---|---|---|
| 4,093,171 A | 6/1978 | Mengo, Sr. |
| 4,104,917 A * | 8/1978 | Rieth et al. ................. 374/136 |
| 4,156,320 A * | 5/1979 | Kammeraad ................. 43/27.4 |
| 4,167,829 A * | 9/1979 | Henze et al. ................. 43/27.4 |
| 4,226,394 A | 10/1980 | Einhorn |
| 4,248,002 A | 2/1981 | McNellis |
| 4,251,940 A * | 2/1981 | Henze et al. ................. 43/27.4 |
| 4,428,139 A * | 1/1984 | Henze et al. ................. 43/27.4 |
| 4,438,582 A * | 3/1984 | Lummis ..................... 43/27.4 |
| 4,551,939 A * | 11/1985 | Kitchens ..................... 43/21.2 |
| 4,807,386 A * | 2/1989 | Emory, Jr. ................... 43/27.4 |
| 4,901,469 A | 2/1990 | Murray |
| 4,948,083 A * | 8/1990 | McNaney et al. ........... 43/21.2 |
| 5,040,759 A | 8/1991 | Wainwright |
| 5,054,737 A * | 10/1991 | DeLancey ................... 43/21.2 |
| 5,170,581 A * | 12/1992 | Lyons ........................ 43/43.12 |
| D332,299 S | 1/1993 | Dryna et al. |
| 5,191,852 A * | 3/1993 | Rupp .......................... 43/27.4 |
| 5,245,780 A * | 9/1993 | Hansen et al. ............... 43/27.4 |
| 5,369,971 A | 12/1994 | Sheppard |
| 5,438,789 A * | 8/1995 | Emory ........................ 43/21.2 |
| 5,445,102 A * | 8/1995 | Rupp .......................... 43/27.4 |
| 5,756,912 A | 5/1998 | Liao |
| 5,761,844 A * | 6/1998 | Horschel ..................... 43/21.2 |
| 5,813,162 A * | 9/1998 | Tse et al. ...................... 43/21.2 |
| 5,871,196 A * | 2/1999 | Martelli ...................... 43/21.2 |
| 6,037,538 A | 3/2000 | Brooks |
| 6,162,104 A | 12/2000 | White |
| 6,266,850 B1 | 7/2001 | Williams et al. |
| 6,505,431 B1 * | 1/2003 | Christian et al. ............ 43/21.2 |
| 6,561,117 B1 * | 5/2003 | Kell ........................... 114/364 |
| 6,591,541 B1 * | 7/2003 | Cummings .................. 43/21.2 |
| 6,634,134 B1 * | 10/2003 | Nyquist ....................... 43/21.2 |
| 6,637,146 B2 * | 10/2003 | Ernst ........................... 43/21.2 |
| 6,684,558 B1 * | 2/2004 | Gillespie .................... 43/27.4 |
| 6,769,377 B2 * | 8/2004 | Rupp, II ...................... 43/21.2 |
| 6,851,654 B2 * | 2/2005 | Slatter ........................ 43/27.4 |

* cited by examiner

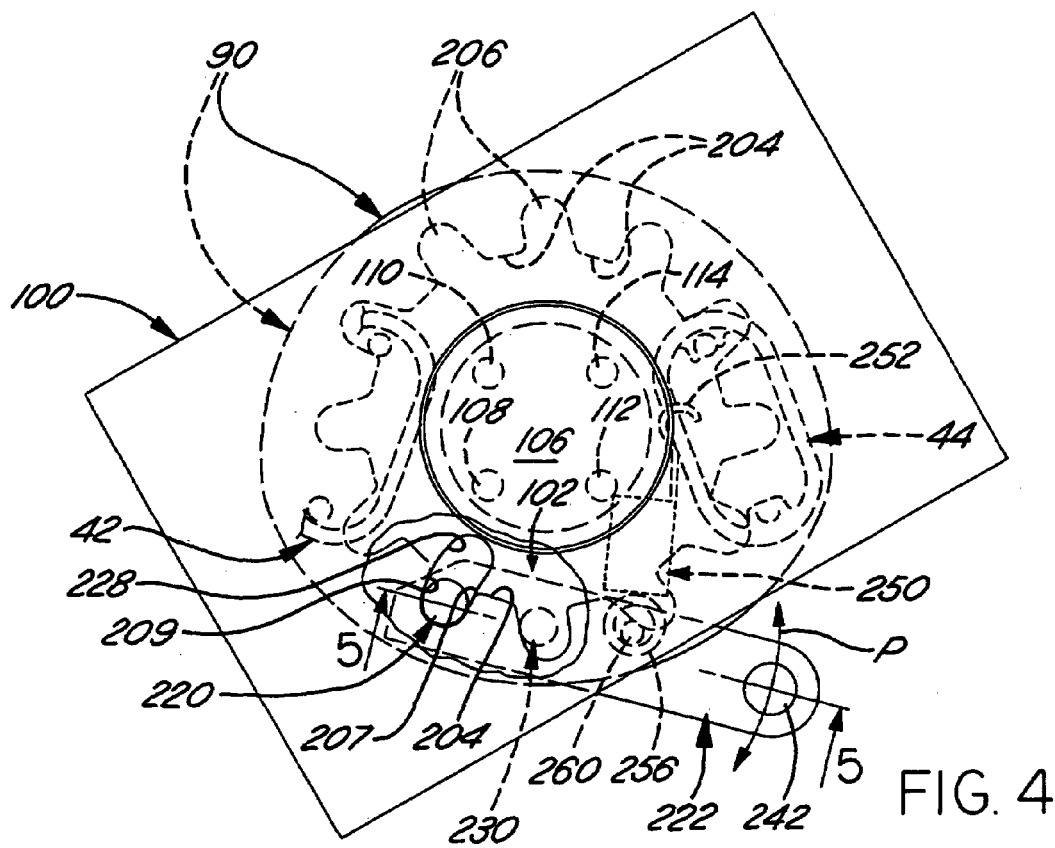
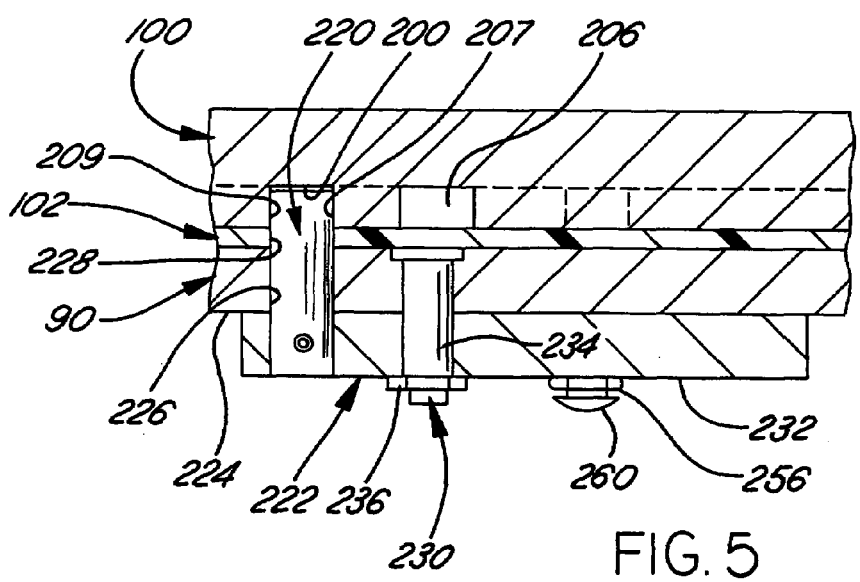

ADJUSTABLE SWIVEL BASE

This is a United States regular utility patent application filed pursuant to 35 U.S.C. §111(a) and claiming the benefit of the priority application under 35 U.S.C. §119(e)(1) of U.S. provisional application Ser. No. 60/445,978 filed Feb. 7, 2003.

FIELD OF THE INVENTION

This invention relates primarily to fishing equipment designed for trolling from a moving boat, primarily for use in deep water sport and commercial fishing, and more particularly to devices for holding down rigger masts and planer board masts used for fishing that allows these masts to be swiveled in a full circle and locked at selected angularly spaced increments.

BACKGROUND OF THE INVENTION

Fishing is one of the oldest vocations and avocations. In the last fifty years or so the equipment and fishing techniques have evolved into increasingly sophisticated products and strategies for catching fish. Bait fish seek water at a certain temperature and water depth. The big fish follow them to feed on them. Numerous electronic devices have been provided to detect water temperature variations at different depths, to locate schools of fish at different locations and to provide a read-out of underwater topography where fish congregate. Modern trolling motors allow both large and small fishing and commercial boats to move at slow and controlled trolling speeds through the water.

It is preferred to equip trolling boats with the ability to fish with more than one fishing rod at a time in order to multiply the number of possibilities for catching fish simultaneously or in close sequence to thereby increase the chances of catching fish. Fishing boats are often equipped with mounting tracks along their port and starboard gunnels and across the transom top board to thereby enable fishermen to use more than one fishing rod, because many rod holders will fit into the track. Usually the track is mounted to the boat permanently.

Down riggers add another dimension to trolling fishing by allowing fishermen to fish at a controlled depth. Being able to fish with more than one down rigger at a time is another strategy that increases the chances of catching fish. Down riggers have a long boom with a heavy-duty aircraft cable line to which a heavy sinker is attached. The heavy-duty line and sinker are necessary to keep the fishing line at a controlled or constant depth at trolling speeds. To maximize the performance of down rigger, they need to be mounted on a swivel mechanism that is easy to swivel and easy to lock and unlock. With multiple down riggers deployed it is necessary to be able to adjust the down rigger masts by swiveling them so that their lines will not interfere with each other. In addition, as the boat navigates a turn in its course, being able to swivel down riggers helps keeps the fishing lines from fouling the propellers. Other and different fishing techniques, such as planer board fishing, are also enhanced by mounting the associated rods on swivel bases.

Although hitherto a variety of different types of swivel bases for mounting down rigger masts and planer board masts have been provided in an attempt to accommodate most, if not all, of the aforementioned usage parameters, there remains much room for improvement in such devices. For example, there is a need to improve the ease of which the swivel base can be locked and unlocked to permit the desired swivel action. There is also a need for improvement in the locking system provided in the adjustable swivel base from the standpoint of strength, elimination of play or "slop" in the various locked positions of the device, reduction in manufacturing costs, and ability to smoothly operate under heavy applied loads that are exerted by the cantilever action of the down rigger and planer board masts on the mounting base.

With all these needs, there still remains an overall need that such particular needs be met with an improved adjustable swivel base mechanism able to take the extreme loads of big fish and heavy sinkers on the fishing lines even when trolling at relatively fast deep sea sport and commercial fishing speeds.

OBJECTS OF THE INVENTION

Accordingly, among one or more objects of the present invention are to provide an improved adjustable swivel base for holding down rigger masts and planer board masts that satisfies all of the foregoing needs with a strong, corrosion-resistant structure that is economical to manufacture and assemble, that is readily adjustable to provide a variety of selected angularly spaced positions of operable and stored repose of the down rigger mast or planer board mast mounted on the base, that is securely but releasably lockable in any one of the angular locking positions of the swivel base and that is designed to compensate for wear of the locking mechanism parts and to eliminate play in locked positions, that is readily adapatable to being track mounted and locked in selected positions along the track, that enables the base to be removed, after use, along with the down rigger or planer board mast attached to it, and then stored on the boat in a secure location out of the weather, and which is simple in construction, compact, easy to mount and easy to operate.

BRIEF DESCRIPTION OF THE DRAWINGS

The foregoing, as well as further objects, and also features and advantages of the present invention, will become apparent from the following detailed description of the best mode presently known to the inventors of making and using the invention, as well as from the accompanying drawings (which are drawn to engineering scale unless otherwise indicated), wherein:

FIG. 4 is a top plan view of the swivel base assembly of FIGS. 1–3 with the base assembly top plate rotated out of parallelism with the base track-mounting plate and with a portion of the top plate broken away to illustrate interior details.

FIG. 5 is a fragmentary cross sectional view taken on the line 5—5 of FIG. 4 and enlarged thereover.

DETAILED DESCRIPTION OF PREFERRED EMBODIMENTS

Figure 1:
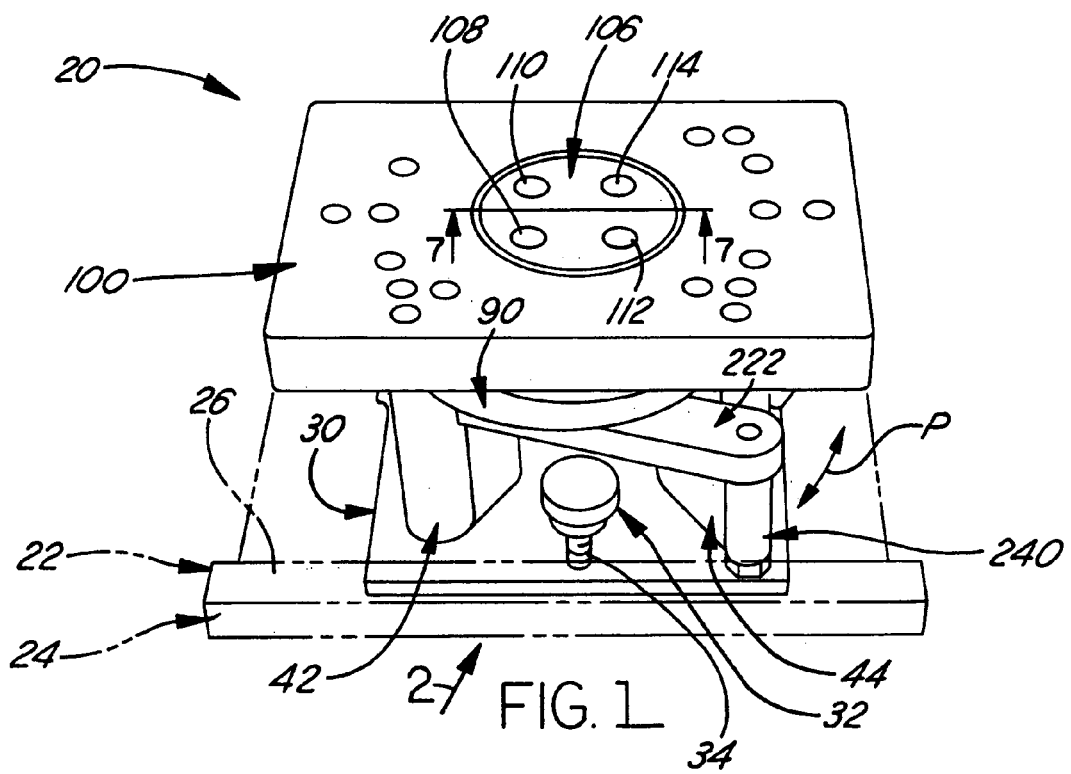
FIG. 1 is a perspective view (looking down from above and from the front) of a presently preferred but exemplary embodiment of an improved adjustable swivel base assembly of the present invention mounted on a track (shown in phantom) and adapted for mounting thereon on a conventional down rigger mast or planer board mast (not shown).

Referring in more detail to the accompanying drawings, FIG. 1 illustrates a presently preferred but exemplary embodiment of an improved adjustable swivel base assembly 20 of the invention as releasably and adjustably mounted to a mounting track 22. Track 22 may be of conventional construction and in turn is mounted by suitable fasteners (not shown) to a gunnel, transom rail or other suitable mounting area of an associated fishing boat (not shown).

Figure 2:
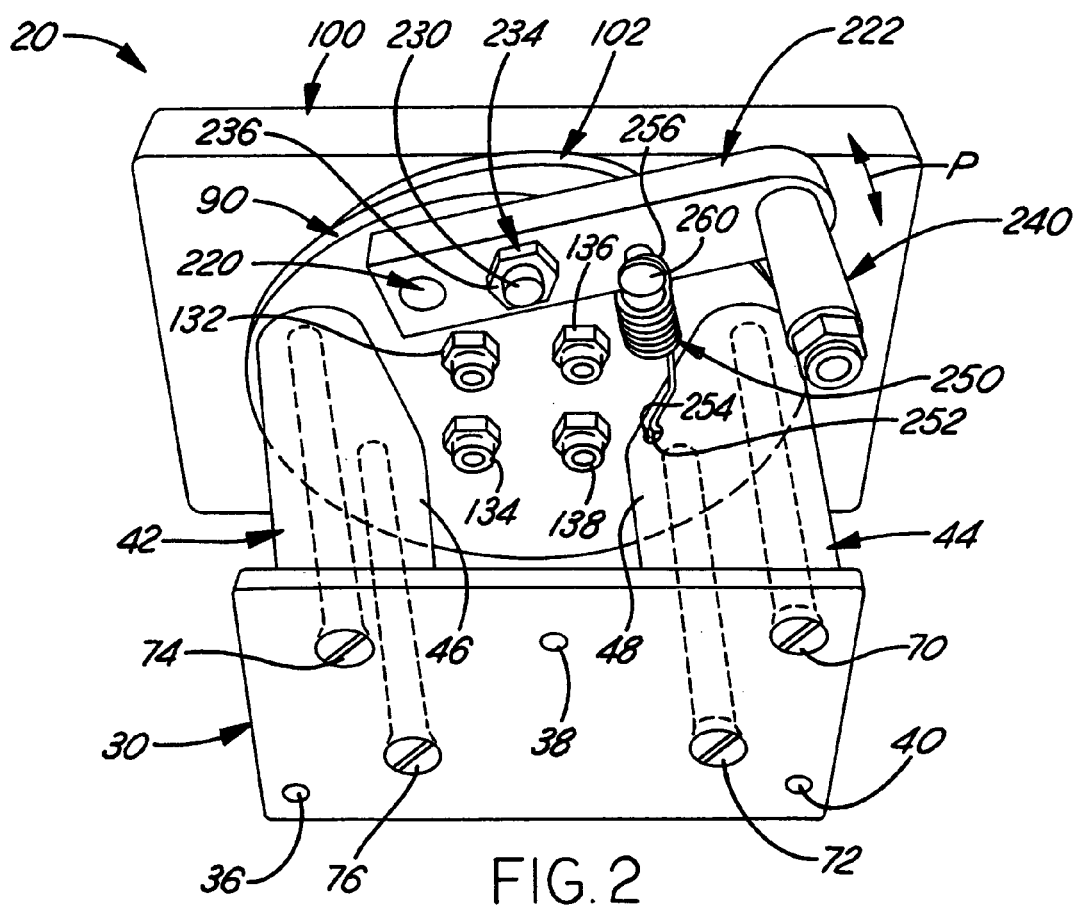
FIG. 2 is a perspective view of the adjustable swivel base assembly of FIG. 1 (looking up from below and from the front), i.e., as viewed generally looking in the direction and location of the arrow 2 of FIG. 1, the swivel base assembly being shown by itself separate from the track of FIG. 1.

Track 22 has a pair of opposed upright side flanges, only one of the flanges 24 being shown, each having an in-turned lip 26 overlying the bed or upper surface of track 22. Base assembly 20 has a rectangular mounting base plate 30 having width and height dimensions such that the base plate sits closely but slidably between the side flanges of track 22 and underlies the overlapping flange lips 26 on each side of the track to thereby capture the base plate against liftoff from the track. To lock the base plate 30 on the track the base plate is provided with a plurality (preferably three) of thumb screws 32. The threaded shank 34 of each thumb screw is threadably engaged in an associated one of three threaded through-holes 36, 38 and 40 (FIG. 2) provided in plate 30 and oriented as shown in FIG. 2. Screwing down these thumb screws 32 lifts base plate 30 against the underside of flange lips 26 and develops a strong frictional clamping force for holding the base assembly 20 from movement along the length of track 22.

Figure 3:
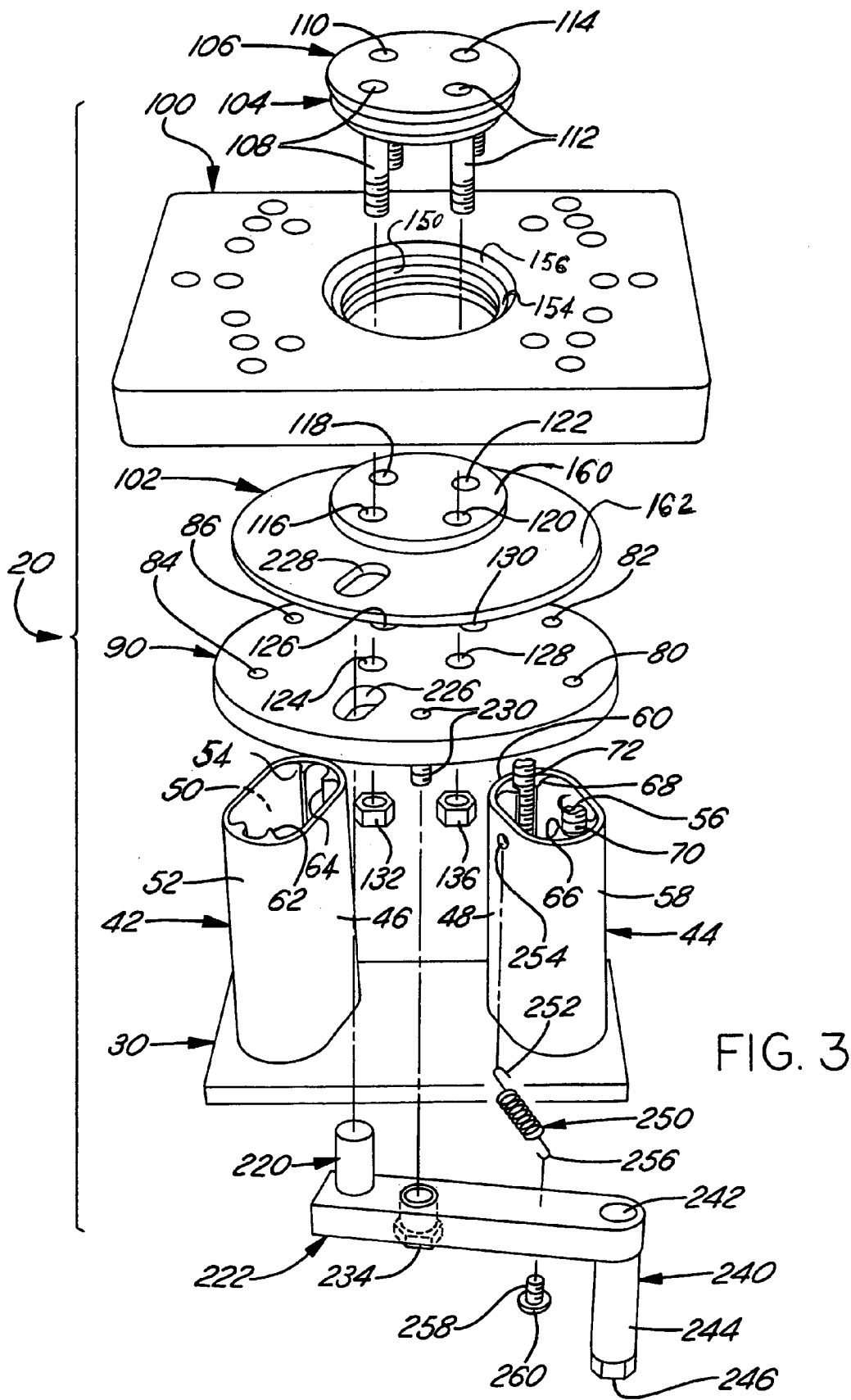
FIG. 3 is an exploded perspective view of the adjustable swivel base assembly of FIGS. 1 and 2 to better illustrate the construction and assembly of its component parts as used in the preferred form of FIGS. 1 and 2.

A pair of obround risers 42 and 44 are symmetrically mounted to plate 30 with an angled orientation relative to one another as shown in FIGS. 1, 2, 3 and 4, such that their flat facing side surfaces 46 and 48 define an included angle therebetween of about 40°. Each riser 42, 44 is preferably made as an aluminum extrusion having a cross sectional contour that is seen in FIGS. 3 and 4, namely an "obround" contour such that riser 42 has parallel flat side walls 46 and 50 merging with semicircular end walls 52 and 54. Likewise, riser 44 has parallel flat sidewalls 48 and 56 merging with semicircular end walls 58 and 60.

The interior surface of each of the curved riser end walls 52, 54, 58 and 60 has an individually associated integral, longitudinally extending screw boss 62, 64, 66 and 68 respectively. Each screw boss defines an interior channel with a circular wall surface encompassing about 270° and having a diameter for slidably receiving therethrough an associated mounting screw. Two of such mounting screws 70 and 72 are shown fragmentarily in FIG. 3 inserted respectively in associated screw bosses 66 and 68 of riser 44. Identical mounting screws 74 and 76 (FIG. 2) extend respectively through the screw bosses 62 and 64 of riser 42. Plate 30 is provided with suitable through-holes that are beveled on the underside to individually receive the flat heads of the mounting screws 70–74 (FIG. 2). The threaded upper ends of mounting screws 70–74 individually threadably engage threaded through-holes 80, 82, 84 and 86 respectively provided in a bottom bearing plate 90 of base assembly 20 (FIG. 3). Plate 90 is thus fixedly and securely screw-mounted on and supported by risers 42 and 44 which in turn are securely screw-affixed to and supported by mounting base plate 30.

Figure 7:
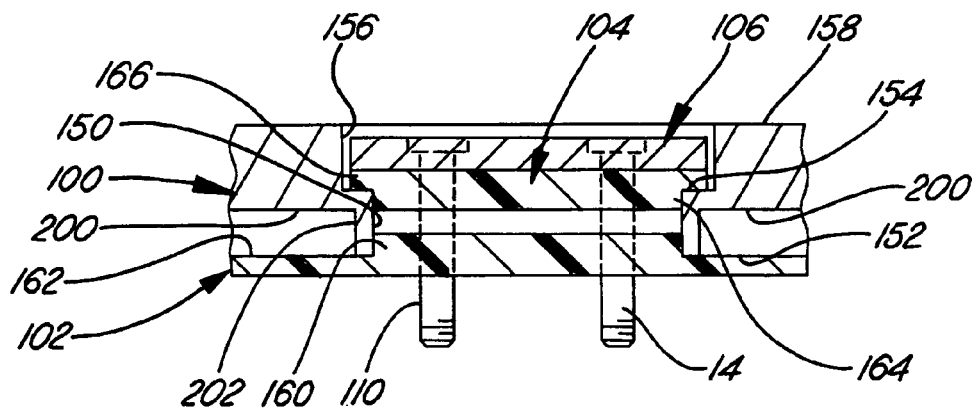
FIG. 7 is a fragmentary cross sectional view taken on the line 7—7 of FIG. 1 and enlarged thereover.
Figure 9:
FIG. 9 is a side elevation view of the bottom bearing of FIG. 8.
Figure 10:
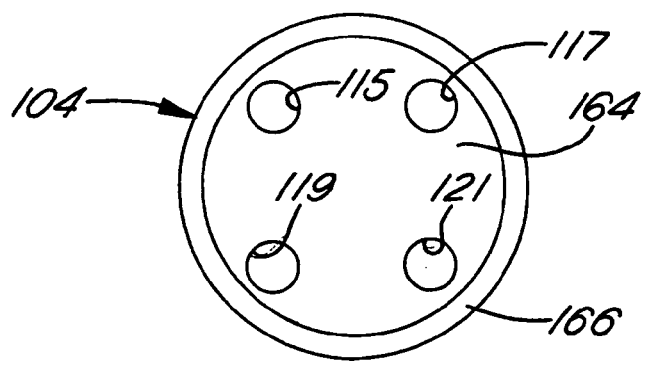
FIG. 10 is a bottom plan view of the top bearing of the base swivel mechanism shown by itself.
Figure 11:
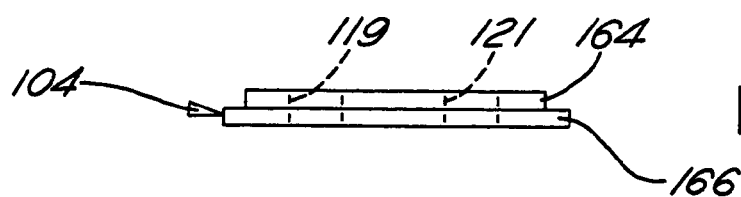
FIG. 11 is a side elevation view of the top bearing of FIG. 10.

Base assembly 20 further includes a rotatable top plate 100 journaled for rotation on and between a bottom bearing 102 and a top bearing 104 that are stationarily affixed to bottom bearing plate 90 by a top bearing cover plate 106 carrying four threaded studs 108, 110, 112 and 114 (FIGS. 3, 4 and 7). These studs 108–114 extend through mating holes 115, 117, 119 and 121 in top bearing 104 (FIGS. 10 and 11), through registering holes 116, 118, 120 and 122 in bottom bearing 102 (FIGS. 8 and 9), and thence through registering holes 124, 126, 128 and 130 in bottom bearing plate 90 (FIG. 3). As shown in FIG. 2, the lower ends of studs 108–114 project from the underside of plate 90 and receive thereon locking hex nuts 132, 134, 136 and 138 respectively.

Figure 6:
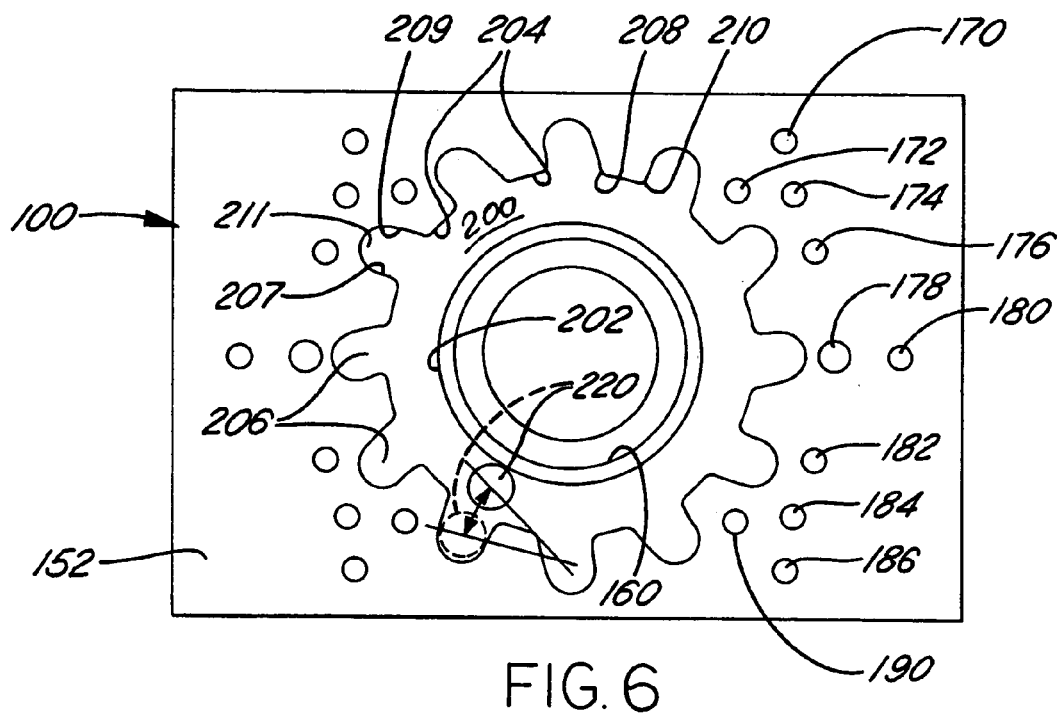
FIG. 6 is bottom plan view of the top plate of the swivel base assembly shown by itself.

As best seen in FIGS. 3, 6 and 7, top plate 100 has a central through-hole defined by a bearing bore 150 extending upwardly from the plane of under face 152 of plate 100 to a junction at annular shoulder 154 with a bearing counterbore 156 in turn opening to the top face 158 of plate 100. Bottom bearing 102 has a raised circular central bearing boss 160 (see also FIGS. 8 and 9) received with a close clearance sliding fit in bearing bore 150. The bottom face 152 of plate 100 rides slidably on the upper surface 162 of bottom bearing 102 that encircles boss 160. As best seen in FIG. 7, the top bearing 104 also has a bearing boss portion 164 that fits slidably within plate bearing bore 150, and has a radially extending marginal flange portion 166 that rides slidably on plate shoulder 154. Plate 100 is thus clamped by top bearing 104 and bottom bearing 102, both of which are in turn held fixed by studs 110–114 to bottom bearing plate 90.

It will be seen that bearings 102 and 104, in accordance with one of the features of the invention, thus provide a special heavy duty bearing system featuring large swivel-bearings for both the top and bottom of plate 100 to enable 360° rotatable mounting of plate 100 on base assembly 20 while heavily loaded. This is important because the loads of the down rigger mast to be mounted on plate 100 often are extreme cantilever loads as well as thrust and axial gravitational loads. With this type of loading, there is a need for the large bearing surfaces of both top and bottom bearings 104 and 102 in order to obtain a smooth, low force swivel action. It will be seen from FIGS. 6–11 that the bearing system of the present invention is well designed to withstand such heavy cantilever loads that apply force to the top, bottom and sides of the bearings. Note that both the top and bottom bearings 104 and 102 are flanged to take such loads. The materials employed in bearings 102 and 104 may be Delrin®, nylon or preferably ultra-high molecular weight (UHMW) polyethylene. Note that these plastic bearing plates 102 and 104 are backed up with metal plates top and bottom, i.e., top bearing cover plate 106 and bottom bearing plate 90. The four fasteners 108, 110, 112 and 114 that bolt through the bearing assembly are tensioned to a predetermined torque to minimize play or a loose fit between the moving swivel parts and yet still allow plate 100 to swivel freely relative to the remaining base components.

It will also be noted that top plate 100 is provided with a predetermined "universal" pattern of threaded through-holes 170–190 on the right hand side of plate 100 (as viewed in FIG. 6), as well as a mirror image symmetrical array of similar mounting holes on the left hand side of plate 100 (as viewed in FIG. 6). These threaded holes are pre-determined by design to match up with the mounting bolt pattern of the most popular models of down rigger mounting platforms that are to be removably attached to plate 100 by mounting threaded fastener, thumb screw or the like.

In order to maximize operational performance of down riggers they need to be mounted on a swivel mechanism that is easy to swivel while being capable of taking the heavy cantilever loads. It will be seen that base assembly 20 achieves this result. It is also necessary, in order to maximize the performance of down riggers, that the swivel base be easy to lock and unlock with a positive, reliable, strong and rugged locking system. Swivel base 20 of the invention also provides this feature, thereby enhancing the performance of down riggers and other trolling equipment via swivel mounting and locking at selected spaced angular increments about a 360° swivel traverse.

Thus, in accordance with this locking system feature of the present invention the adjustable swivel base assembly 20 is provided with an improved gear-like lock system. As best seen in FIG. 6, and in assembly (in phantom) in FIG. 4, this locking system includes a "negative" gear-like profile either molded or machined into the underface 152 of top plate 100. This gear profile includes an annular cavity defined by a top wall 200 and bounded on its inner diameter by a cylindrical wall 202 concentric with and of larger diameter than bore wall 160. Wall 200 is bounded on its outer periphery by equally angularly spaced tooth peak surfaces 204 that define an interrupted cylindrical surface of larger diameter than, and concentric with, wall surface 202. A plurality of equally angularly spaced teeth root cavities 206 extend generally radially outwardly from wall 200, one cavity between each pair of tooth peaks 204. Each tooth peak 204 terminates circumferentially at relatively sharp or small radius corners 208 and 210.

Figure 8:
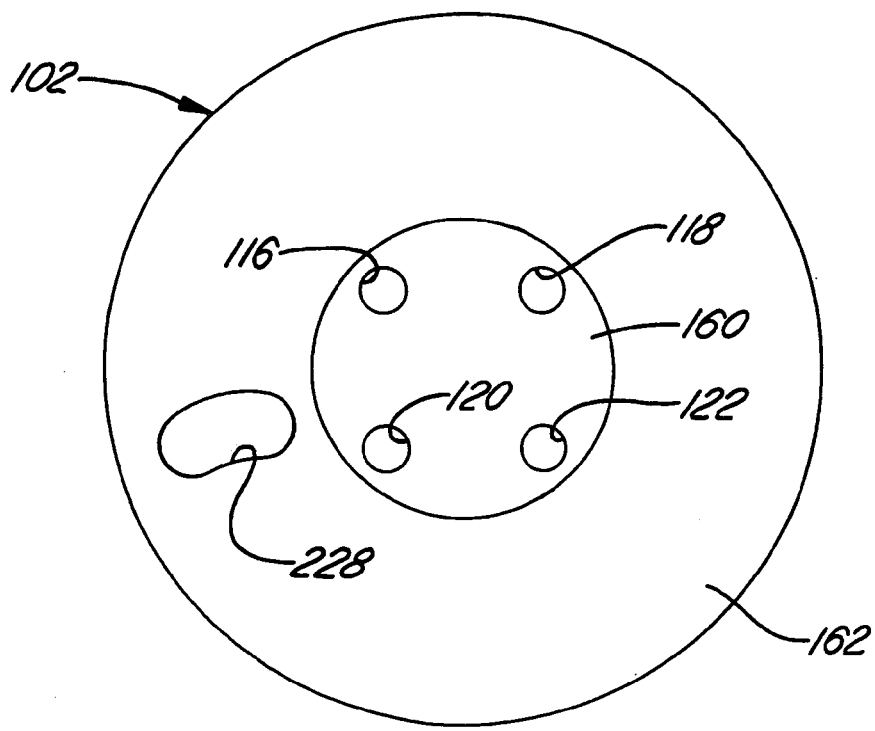
FIG. 8 is a top plan view of the bottom bearing of the base swivel mechanism shown by itself.

The locking system also includes a cylindrical locking pin 220 mounted on one end of a locking lever 222 that is pivotally mounted to bottom bearing plate 90 flush against its underface 224 (FIG. 5). Pin 220 extends upwardly through a specially formed arcuate slot 226 in bottom bearing plate 90 and further upwardly through a registering arcuate slot 228 formed in bottom bearing 102 (FIGS. 3, 4 and 8). The upper end of pin 220 enters the aforementioned annular cavity defined by cylindrical wall 202, top wall 200, the teeth apexes 204 and negative tooth root spaces 206.

Lever 222 is pivotally attached to bottom bearing plate 90 by a threaded stud 230 (FIGS. 2, 3, 4 and 5) press fitted at its upper end in plate 90 and protruding downwardly therefrom past the lower surface 232 of lever 222. An internally threaded bearing sleeve 234, having a hex nut 236 integrally formed at its lower end, is threadably received on stud 230 to thereby both attach lever 222 to plate 90 as well as to form the pivot bearing surface for pivotal swinging motion of lever 222 about the pivot axis of pin 230 (as indicated by arrow P in FIGS. 1, 2 and 4). The opposite end of lever 222 remote from locking pin 220 is provided with a downwardly extending handle 240. Preferably this handle comprises a threaded stud 242 press fit at its upper end into an opening at the handle end of lever 222 and receiving a plastic sleeve 244 thereon that is free to rotate thereon and held on the stud by a lock nut 246 threaded onto the lower end of stud 242. Lever 222 is spring biased toward a locking position, preferably by a tension coil spring 250 having one end tang 252 hooked into a hole 254 drilled into sidewall 48 of riser 44, and having its other end tang 256 hooked around the shank 258 of a rivet 260 that extends through lever 222. Thus, as indicated in FIG. 4, lever 22 is normally spring biased to pivot in a direction to drive locking pin 220 toward the root or bottom of whichever negative tooth recess 206 it is selectively registered.

In operation, in order to release top plate 100 for swivel motion of the same, along with whatever down rigger or planer board mast load is mounted thereon, the operator merely manually grips handle 240 and pulls it outwardly away from the base assembly 20. This pivotally rotates lever 222 in a clockwise direction as viewed in FIGS. 1, 2 and 4, thereby forcing locking pin 220 to travel radially inwardly of the plate gear profile and in a slightly arcuate path that is accommodated by the arcuate guide and pin-bracing slot 226 in plate 90 and slot 228 in bearing 102. When lever 222 is pulled outwardly to the full limit of its pivotal travel clockwise, pin 220 will be registering with the annular space between cylindrical wall 202 and the teeth apexes 204, i.e., out of registry with the negative locking teeth in plate 100 (solid line position of pin 220 in FIG. 6). When locking handle is pulled to this full release position, top plate 100 is free to swivel about the axis of the bearings 102 and 104.

Once unlocking force is removed from lever 222 by releasing handle 240 and initial swivel motion is imparted to plate 100, spring 250 will bias lever 222 counterclockwise as viewed in FIG. 4, thereby forcing locking pin 220 against whichever tooth apex 204 it may be registered. Further swivel motion of plate 100 will register pin 220 with the next adjacent tooth cavity 206 and spring bias on lever 222 will snap force pin 220 into such cavity. It will be seen that in the preferred embodiment there are twelve tooth cavities 206, thereby providing locking positions at 30° angular increments for a full 360° swivel traverse of plate 100. It is to be noted that the corners 208 and 210 at the circumferentially opposite ends of each tooth apex 204 are relatively sharp and have a small radius dimension. This geometry has been found to produce a snap action drop in of locking pin 220 as spring 250 pulls lever 222 counterclockwise as viewed in FIG. 4. This positive snap action seating of locking pin 220 is considered a desirable safety feature in the mode of operation of base assembly 20.

In accordance with another feature of the present invention, the negative tooth recesses 206 are generated on a longitudinal center line that is curved with the same radius as the arcuate path of travel of locking pin 220. This is perhaps best seen in FIGS. 4 and 6. The range of travel of locking pin 220 is indicated in FIG. 6 where the fully unlocked position of pin 220 is shown in solid lines and the fully locked position of pin 220 is shown in broken lines. This curvature of each tooth recess 206 allows a quick drop in action of pin 220 upon being initially registered with a tooth recess under the biasing force of spring 250, and with lever 222 released. It is also to be noted that the sidewalls 207 and 209 (FIG. 6) of each tooth recess 206 are tapered so as to converge slightly radially outwardly toward the associated tooth root surface 211. Sidewalls 207 and 209 reach a transverse dimension less than the diameter of locking pin 220 at a point in the travel path of pin 220 such that the locking pin cannot touch the bottom of root surface 211 of tooth recess 206. Hence, the locking pin 220 seats, in locked position, against the sidewalls 207 and 209 of the associated tooth recess 206 without bottoming in the same.

Because pin 220 so engages the sidewalls of the associated gear recess 206, there is little play when in swivel lock up because pin 220 tends to lock up when gripped by the tapered sidewalls as it reaches the center of the profile of the gear recess. Also, because the pin does not bottom out in the associated gear profile recess 206, if the sidewalls 207 and 209 wear with use, pin 220 will just seat a little deeper in the gear profile, thereby providing compensation for wear in the system. In addition, because the curved walls 207 and 209 follow the arcuate path of travel of locking pin 220 in its operative range of lock-unlock motion (see FIGS. 4 and 6), top plate 100 can be unlocked readily by pulling outwardly on handle 240 without having to exert force on the swivel top plate, and/or down rigger mounted thereon, in order to engage and disengage the locking pin from the gear profile recess 206.

As indicated previously, the small radius corners 208, 210 of each gear apex 204 cause locking pin 220 to accelerate more rapidly when registering and going into a gear profile pocket or recess 206. This in turn gives a desirable snap action mode of operation.

As another safety feature, the lever operating handle 240 extends downwardly from lever 222, thereby eliminating a potential pinch point for the operator relative to plate 90. Also, the unlocking mode is a pull-out action on handle 240 relative to the base assembly. This is a further safety feature that keeps the swivel base 20 from being inadvertently unlocked, as what might happen if the operator were required to push in the handle in order to unlock the swivel plate 100.

The mounting of the two obround extrusions 42 and 44 at the aforementioned 40° included angle relative to one another angle provides structural rigidity and is compact enough to enable base 20 fit into a six inch track. The obround extrusions 42 and 44 have the built in screw bosses 62, 64, 66 and 68 integrally formed during the extrusion of the part as a cost saving. By making the risers 42 and 44 as extrusions, they can be cut to different lengths and thereby allow different heights of risers to be easily used in the production of different height models of adjustable swivel base assemblies 20. Note that the bottom plate 90 is made slightly oval, as seen in FIG. 4, to make the adjustable swivel base 20 better fit into a six inch wide track 22.

It will also be evident from the foregoing description and drawings that the adjustable swivel base assembly 20 of the invention is constructed with rugged dimensional relationships, and when constructed to the scale of the drawings provides a swivel locking mechanism that is strong enough to take the heavy loads of big fish and heavy sinkers tugging on fishing lines, as well as the loads of planer boards and other large cantilever mast loads.

The anti-wear feature provided by designing locking pin 220 to lock in the center of the selected tooth space 206, such that the locking pin cannot engage the bottom or root face 211 between the tooth recess sidewalls 207 and 209, insures minimum swivel rotational movement or "play" of the swivel base assembly when in locked condition. Wear compensation is also thereby achieved, because locking pin 220 will lock up in a non-bottoming range of tooth sidewall engagement positions even if the sidewalls of the gear teeth and/or pin surface erode from wear over a prolonged usage period.

From the foregoing description it also will now be evident that the novel principles of construction and operational mode of the invention can be advantageously employed in other mechanisms, besides as an adjustable swivel base for a down rigger mast or a planer board mast, that advantageously require rotational locking and unlocking action about a vertical axis or other axis about which swivel motion is desired, such as in various seating applications such as seat swivels, platform swivels and the like. Accordingly, the invention is not intended to be limited to the particular embodiments disclosed and is intended to cover equivalent structures and mechanisms that may be beyond the literal scope of the present preferred embodiments as illustrated and disclosed herein; but yet within the spirit and intent of the present invention, as limited only by the lawfully applicable prior art.

What is claimed is:

1. An adjustable swivel base assembly comprising:
   (a) a planar mounting base plate defining a first major plane,
   (b) a pair of laterally spaced apart columnar supports affixed at a first longitudinal end thereof to said base plate and extending therefrom generally perpendicularly relative to the major plane thereof,
   (c) a planar bearing plate defining a second major plane and being stationarily supported on a second longitudinal end of said supports opposite said first longitudinal end thereof,
   (d) a planar first bearing defining a third major plane and being stationarily supported on said bearing plate on a side thereof remote from said supports,
   (e) a planar second bearing defining a fourth major plane and being stationarily affixed to said bearing plate and spaced from and coaxial with said first bearing, said major planes being oriented generally parallel with one another,
   (f) a planar rotatable swivel plate supported on and sandwiched slidably between said first and second bearings for rotation in a plane generally parallel to said major planes, said rotatable swivel plate being adapted to carry a load to be swiveled by said rotation of said rotatable plate, and
   (g) an indexable locking system for selectively locking said rotatable swivel plate in any one of a plurality of angularly spaced positions.

2. The assembly set forth in claim 1 wherein said supports comprise a pair of risers each having an obround exterior contour and being symmetrically mounted to said base plate and having generally flat facing surfaces with an angled orientation relative to one another such that said facing surfaces define an included angle therebetween of about 40°.

3. The assembly set forth in claim 2 wherein each said riser is made as an aluminum extrusion having a cross sectional contour to form the obround contour whereby the riser has parallel flat side walls merging with semicircular end walls.

4. The assembly set forth in claim 3 wherein an interior surface of each said semicircular end wall has individually associated therewith an integral, longitudinally extending screw boss defining an interior channel with a circular wall surface encompassing about 270° and having a diameter for slidably receiving therethrough an associated mounting screw inserted through an associated hole in said base plate and threadably secured at one end thereof in said bearing plate such that said bearing plate is fixably and securely screw-mounted on and supported by said risers which in turn are thereby securely screw-affixed to and supported by said mounting base plate.

5. The assembly set forth in claim 1 wherein said swivel plate has a central through-hole defined by a bearing bore extending from a planar first side of said swivel plate adjacent said first bearing to a junction at an annular shoulder with a bearing counterbore in said swivel plate that in turn opens to a second planar side of said swivel plate remote from said first bearing, and wherein said first bearing has a raised circular central bearing boss received with a close clearance sliding fit in said bearing bore such that said first side of said swivel plate rides slidably on an adjacent surface of said first bearing that encircles said central bearing boss of said first bearing, and wherein said second bearing also has a bearing boss portion that fits slidably within said plate bearing bore and has a radially extending marginal flange portion that rides slidably on said annular shoulder of said swivel plate through-hole defining said bearing bore and wherein said swivel plate is clamped by and between said first and second bearings, both of which are held affixed by studs extending to and fastened to said bearing plate.

6. The assembly set forth in claim 5 wherein said first and second bearings are made of plastic material, and wherein said first and second bearings are backed up respectively by a second metal bearing cover plate overlying said second bearing and by said bearing plate with said bearing plate being made of metal, and wherein said studs are constructed and arranged such to extend through the assembly of said first and second bearings as well as said second metal bearing cover plate and said bearing plate and tensioned to a predetermined torque to minimize play or loose fit of said swivel plate and yet still allow the rotatable swivel plate to swivel freely relative to the remaining components of said base assembly.

7. The assembly set forth in claim 1 wherein said swivel plate is provided with a predetermined universal pattern of threaded through-holes, said through holes being predetermined by design to match up with mounting bolt patterns of downrigger mounting platforms of various configurations that are to be removably attached to said rotatable swivel plate by mounting fasteners.

8. The assembly set forth in claim 1 wherein said indexable locking system comprises a negative gear-like profile formed in a side face of said swivel plate disposed adjacent said first bearing, said gear-like profile including an annular cavity defined by a recessed wall inset from and parallel to said swivel plate side face and bounded on an inner diameter by a cylindrical wall surface concentric with said bearings, said cavity recessed wall being bounded on an outer periphery by a plurality of equally angularly spaced tooth peak surfaces that define an interrupted cylindrical surface of larger diameter than, and concentric with, said inner cylindrical wall surface, said gear-like profile further including a plurality of equally angularly spaced teeth root cavities extending entirely radially outwardly from said interrupted cylindrical surface, said cavities being individually arranged between each adjacent pair of said tooth peak surfaces, and further including a locking pin supported by said bearing plate so as to be operable in said annular cavity to be spring biased into selective engagement with a selected one of said teeth root cavities to thereby lock said rotatable swivel plate at a fixed angular position relative to the remaining components of said base assembly, and upon withdrawal of said locking pin from said selected teeth cavity thereby enabling free rotation of said swivel plate relative to the remaining components of said base assembly.

9. The assembly set forth in claim 8 including a locking lever pivotally mounted to said bearing plate and carrying said locking pin, said bearing plate and said first bearing each having arcuate slots formed therein through which said locking pin extends into said annular cavity for swinging in an arcuate travel path between engaged and disengaged positions relative to said teeth root cavities of said gear-like profile in said swivel plate, said lever being pivotally mounted to operate as a lever of the first class with one end carrying said locking pin and the opposite end carrying an operating handle, and further including a coil spring coupled between said lever and one of said support such that said lever is normally spring biased to pivot in a direction to drive said locking pin toward a root or bottom of said selected teeth cavity.

10. The assembly set forth in claim 9 wherein said lever handle is oriented to extend from said lever toward said mounting base plate.

11. The assembly set forth in claim 9 wherein said lever handle is constructed and arranged such that it is swung in a direction outwardly away from said assembly to retract said locking pin out of registry with the selected teeth cavity in said swivel plate and into said annular cavity whereupon said swivel plate is free to swivel about the axis of said first and second bearings, and such that once unlocking force is removed from said lever by releasing said handle said spring is operable to bias said lever to force said locking pin against whichever tooth peak surface it may be registered, whereupon swivel motion of said swivel plate that registers said locking pin with an adjacent teeth cavity allows spring bias on said lever to snap force said pin into such cavity.

12. The assembly set forth in claim 11 wherein said swivel plate has twelve of said teeth cavities, thereby providing locking positions at 30° angular increments for a full 360° swivel traverse of said swivel plate.

13. The assembly set forth in claim 11 wherein each of said tooth peak surfaces terminates at a circumferentially spaced pair of tooth corners located at circumferentially opposite ends of each said tooth peak surface, said tooth corners being relatively sharp and have a small radius dimension to thereby produce a snap action drop in of said locking pin as said spring forces said lever in the lock-up direction.

14. The assembly set forth in claim 11 wherein said teeth root cavities are each generated on a respective longitudinal centerline that is curved with the same radius as the arcuate path of travel of said locking pin whereby upon said lever being released, such curvature of each teeth cavity allows a quick drop in action of said locking pin upon being initially registered with the selected tooth cavity and then forced into such teeth cavity under the biasing force of said spring.

15. The assembly set forth in claim 8 wherein of each said teeth cavity has a pair of juxtaposed sidewalls that are tapered so as to converge slightly radially outwardly of said annular cavity and toward an associated root surface of each said teeth cavity such that said pair of teeth cavity sidewalls are spaced apart by a transverse dimension less than a diameter of said locking pin at a point in a travel path of said pin into any selected one of said teeth cavities such that a locking pin cannot touch the bottom of said root surface of said selected teeth cavity such that said locking pin seats, in locked position, against said sidewalls of said selected teeth cavity without bottoming in the same.

16. An adjustable swivel base assembly and track combination for swivel mounting on a fishing boat of downrigger and/or planar board masts used for fishing, said assembly comprising:

(a) a planar mounting base plate defining a first major plane, (b) a pair of laterally spaced apart columnar supports affixed at a longitudinal bottom end thereof to said base plate and extending therefrom generally perpendicularly upwardly relative to the major plane thereof, (c) a planar bearing plate defining a seond major plane and being stationarily supported on a longitudinal upper end of each said support opposite said bottom end thereof, (d) a planar bottom bearing defining a third major plane and being stationarily supported on said bearing plate on an upper side thereof remote from said supports, (e) a planar top bearing stationarily affixed to said bearing defining a fourth major plane and being plate and spaced upwardly therefrom and coaxial with said bottom bearing said major planes being oriented generally parallel with one another, (f) a planar rotatable swivel top plate supported on and sandwiched slidably between said top and bottom bearings for rotation in a plane generally parallel to the major planes said rotatable swivel plate being adapted to carry a downrigger and/or planar board mast load to be swiveled by said rotation of said rotatable swivel top plate, (g) an indexable locking system for selectively locking said rotatable swivel top plate in any one of a plurality of angularly spaced positions, and (h) a mounting track adapted to be mounted on a gunnel or transom of a fishing boat, said track having side edge flanges with mutually facing in-turned lips, said assembly base plate being slidably mounted in said track with said track flange lips overlapping a pair of opposite side edges of said base plate, said base plate carrying locking means for releasably locking said base plate at a desired location along said track.

17. The combination set forth in claim 16 wherein said supports comprise a pair of risers each having an obround exterior contour and being symmetrically mounted to said base plate and having generally flat facing side surfaces with an angled orientation relative to one another such that said facing surfaces define an included angle therebetween of about 40°.

18. The combination set forth in claim 17 wherein each said riser is made as an aluminum extrusion having a cross sectional contour to form the obround contour whereby the riser has parallel flat side walls merging with semicircular end walls.

19. The combination set forth in claim 18 wherein an interior surface of each said riser semicircular end wall has individually associated therewith an integral, longitudinally extending screw boss defining an interior channel with a circular wall surface encompassing about 270° and having a diameter for slidably receiving therein an associated mounting screw inserted through an associated hole in said base plate and threadably secured at one end thereof in said bearing plate such that said bearing plate is fixably and securely screw-mounted on and supported by said risers which in turn are thereby securely screw-affixed to and supported by said mounting base plate.

20. The combination set forth in claim 16 wherein said swivel plate has a central through-hole defined by a bearing bore extending from a planar bottom side of said swivel plate adjacent said first bottom bearing to a junction at an annular shoulder with a bearing counterbore in said swivel plate that in turn opens to an upper planar side of said swivel plate remote from said bottom bearing, and wherein said bottom bearing has a raised circular central bearing boss received with a close clearance sliding fit in said bearing bore such that said bottom side of said swivel plate rides slidably on an adjacent upper surface of said bottom bearing that encircles said bottom bearing boss, and wherein said top bearing also has a bearing boss portion that fits slidably within said plate bearing bore and has a radially extending marginal flange portion that rides slidably on said annular shoulder of said swivel plate through-hole defining said bearing bore and wherein said swivel plate is clamped by and between said top and bottom bearings, both of which are held affixed by studs extending to and fastened to said stationary bearing plate.

21. The combination set forth in claim 20 wherein said top and bottom bearings are made of plastic material, and wherein said top and bottom bearings are backed up respectively by a top metal bearing cover plate overlying said top bearing and by said bottom bearing plate with said bottom bearing plate being made of metal to serve as the bottom bearing back-up metal cover plate, and wherein said studs are constructed and arranged to extend through the assembly of said top and bottom bearings as well as said top bearing cover plate and said bearing plate and tensioned to a predetermined torque to minimize play or loose fit of said swivel plate and yet still allow the rotatable swivel plate to swivel freely relative to the remaining components of said base assembly.

22. The combination set forth in claim 21 wherein said swivel plate is provided with a predetermined universal pattern of threaded through-holes said through holes being predetermined by design to match up with mounting bolt pattern of downrigger or planar board masts mounting platforms of various configurations that are to be removably attached to said rotatable swivel plate by mounting fasteners.

23. The combination set forth in claim 20 wherein said indexable locking system comprises a negative gear-like profile formed in a side face of said swivel plate disposed adjacent said bottom bearing, said gear-like profile including an annular cavity defined by a recessed wall inset from and parallel to said swivel plate side face and bounded on an inner diameter by a cylindrical wall surface concentric with said bearings, said cavity recessed wall being bounded on an outer periphery by equally angularly spaced tooth peak surfaces that define an interrupted cylindrical surface of larger diameter than, and concentric with, said inner cylindrical wall surface, said gear-like profile further including a plurality of equally angularly spaced teeth root cavities extending entirely radially outwardly from said interrupted cylindrical surface, said cavities being individually arranged between each adjacent pair of said tooth peak surfaces, and further including a locking pin operably supported by said bearing plate so as to be operable in said annular cavity to be spring biased into selective engagement with a selected one of said teeth root cavities to thereby lock said rotatable swivel plate at a fixed angular position relative to the remaining components of said base assembly, and upon withdrawal of said locking pin from said selected teeth cavity thereby enabling free rotation of said swivel plate relative to the remaining components of said base assembly.

24. The combination set forth in said claim 23 including a locking lever pivotally mounted to said bearing plate and carrying said locking pin, said bearing plate and said bottom bearing each having arcuate slots formed therein through which said locking pin extends into said annular cavity for swinging in an arcuate travel path between engaged and disengaged positions relative to said teeth root cavities of said gear-like profile in said swivel plate, said lever being pivotally mounted to operate as a lever of the first class with one end carrying said locking pin and the opposite end carrying an operating handle, and further including a coil spring coupled between said lever and a stationary component of said base assembly such that said lever is normally spring biased to pivot in a direction to drive said locking pin toward a root or bottom of said selected teeth cavity.

25. The combination set forth in claim 24 wherein said lever handle is oriented to extend downwardly from said lever toward said mounting base plate.

26. The combination set forth in claim 25 wherein said lever handle is constructed and arranged such that it is swung in a direction outwardly away from said assembly to retract said locking pin out of registry with the selected teeth cavity in said swivel plate and into said annular cavity whereupon said swivel plate is free to swivel about the axis of said top and bottom bearings, and such that once unlocking force is removed from said lever by releasing said handle said spring is operable to bias said lever to force said locking pin against whichever tooth peak surface it may be registered, whereupon swivel motion of said swivel plate that registers said locking pin with an adjacent teeth cavity allows spring bias on said lever to snap force said pin into such cavity.

27. The combination set forth in claim 26 wherein said swivel plate has twelve of said teeth cavities, thereby providing locking positions at 30° angular increments for a full 360° swivel traverse of said swivel plate.

28. The combination set forth in claim 26 wherein each of said tooth peak surfaces terminates at a circumferentially spaced pair of tooth corners located at circumferentially opposite ends of each said tooth peak surface, said tooth corners being relatively sharp and have a small radius dimension to thereby produce a snap action drop in of said locking pin as said spring forces said lever in the lock-up direction.

29. The combination set forth in claim 26 wherein said teeth root cavities are individually generated along a respective longitudinal centerline that is curved with the same radius as the arcuate path of travel of said locking pin whereby upon said lever being released, such curvature of each teeth cavity allows a quick drop in action of said locking pin upon being initially registered with the selected tooth cavity and then forced into such teeth cavity under the biasing force of said spring.

30. The combination set forth in claim 29 wherein each said teeth cavity has a pair of juxtaposed sidewalls that are tapered so as to converge slightly radially outwardly of said annular cavity and toward an associated root surface of each said teeth cavity such that said teeth cavity sidewalls of each teeth cavity are spaced apart by a transverse teeth cavity dimension less than diameter of said locking pin at a point in the travel path of said pin in any selected one of said teeth cavities such that the locking pin cannot touch a bottom of said root surface of each said selected teeth cavity and such that said locking pin seats, in locked position, against said sidewalls of each said selected teeth cavity without bottoming in the same.

31. A method for swivel mounting on a fishing boat of downrigger and/or planar board masts used for fishing, said method comprising the steps of:
 (a) providing a planar mounting base plate defining a first major plane,
 (b) providing a pair of laterally spaced apart columnar supports affixed at a longitudinal bottom end thereof to said base plate and extending therefrom generally perpendicularly upwardly relative to the major plane thereof,
 (c) providing a planar bearing plate defining a second major plane and being stationarily supported on a longitudinal upper end of each said support opposite said bottom end thereof,
 (d) providing a planar bottom bearing stationarily supported on said bearing defining a third major plane and being plate on an upper side thereof remote from said supports,
 (e) providing a planar top bearing stationarily affixed to said bearing defining a fourth major plane and being plate and spaced upwardly therefrom and coaxial with said bottom bearing said major planes being oriented generally parallel with one another,
 (f) providing a planar rotatable swivel top plate supported on and sandwiched slidably between said top and bottom bearings for rotation in a plane generally parallel to the major planes said rotatable swivel plate being adapted to carry a downrigger and/or planar board mast load to be swiveled by said rotation of said rotatable swivel top plate,
 (g) providing an indexable locking system for selectively locking said rotatable swivel top plate in any one of a plurality of angularly spaced positions, and
 (h) providing a mounting track mounted on a gunnel or transom of the fishing boat, said track having side edge flanges with mutually facing in-turned lips, and slidably mounting said assembly base plate in said track with said track flange lips overlapping a pair of opposite side edges of said base plate, said base plate carrying locking means for releasably locking said base plate at a desired location along said track.

32. The method set forth in claim 31 wherein said indexable locking system comprises a negative gear-like profile formed in a side face of said swivel plate disposed adjacent said bottom bearing, said gear-like profile including an annular cavity defined by a recessed wall inset from and parallel to said swivel plate side face and bounded on an inner diameter by a cylindrical wall surface concentric with said bearings, said cavity recessed wall being bounded on an outer periphery by equally angularly spaced tooth peak surfaces that define an interrupted cylindrical surface of larger diameter than, and concentric with, said inner cylindrical wall surface, said gear-like profile further including a plurality of equally angularly spaced teeth root cavities extending entirely radially outwardly from said interrupted cylindrical surface, said cavities being individually arranged between each adjacent pair of said tooth peak surfaces, and further including a locking pin operably supported by said bearing plate so as to be operable in said annular cavity to be spring biased into selective engagement with a selected one of said teeth root cavities to thereby lock said rotatable swivel plate at a fixed angular position relative to the remaining components of said base assembly, and upon withdrawal of said locking pin from said selected teeth cavity thereby enabling free rotation of said swivel plate relative to the remaining components of said base assembly.

33. The method set forth in claim 32 including a locking lever pivotally mounted to said bearing plate and carrying said locking pin, said bearing plate and said bottom bearing each having arcuate slots formed therein through which said locking pin extends into said annular cavity for swinging in an arcuate travel path between engaged and disengaged positions relative to said teeth root cavities of said gear-like profile in said swivel plate, said lever being pivotally mounted to operate as a lever of the first class with one end carrying said locking pin and the opposite end carrying an operating handle, and further including a coil spring coupled between said lever and a stationary component of said base assembly such that said lever is normally spring biased to pivot in a direction to drive said locking pin toward a root or bottom of said selected teeth cavity.

34. The method set forth in claim 33 wherein said lever handle is oriented to extend downwardly from said lever toward said mounting base plate.

35. The method set forth in claim 34 wherein said lever handle is constructed and arranged such that it is swung in a direction outwardly away from said assembly to retract said locking pin out of registry with the selected teeth cavity in said swivel plate and into said annular cavity whereupon said swivel plate is free to swivel about the axis of said top and bottom bearings, and such that once unlocking force is removed from said lever by releasing said handle said spring is operable to bias said lever to force said locking pin against whichever tooth peak surface it may be registered, whereupon swivel motion of said swivel plate that registers said locking pin with an adjacent tooth cavity allows spring bias on said lever to snap force said pin into such cavity.

36. The method set forth in claim 35 wherein each of said tooth peak surfaces terminates at a circumferentially spaced pair of tooth corners located at circumferentially opposite ends of each tooth peak surface, said tooth corners being relatively sharp and have a small radius dimension to thereby produce a snap action drop in of said locking pin as said spring forces said lever in the lock-up direction.

37. The method set forth in claim 35 wherein said teeth root cavities are individually generated along a longitudinal centerline that is curved with the same radius as the arcuate path of travel of said locking pin whereby upon said lever being released, such curvature of each teeth cavity allows a quick drop in action of said locking pin upon being initially registered with a selected teeth cavity and then forced into such teeth cavity under the biasing force of said spring.

38. The method set forth in claim 37 wherein of each said teeth cavity has a pair of juxtaposed sidewalls that are tapered so as to converge slightly radially outwardly of said annular cavity and toward an associated root surface of each said teeth cavity such that said teeth cavity sidewalls of each teeth cavity are spaced apart by the transverse tooth cavity dimension less than the diameter of said locking pin at a point in the travel path of said pin in any selected one of said teeth cavities such that the locking pin cannot touch a bottom of said root surface of said selected teeth cavity and such that said locking pin seats, in locked position, against said sidewalls of each said selected teeth cavity without bottoming in the same.

* * * * *